(12) United States Patent
Dang

(10) Patent No.: US 11,813,129 B2
(45) Date of Patent: Nov. 14, 2023

(54) METHOD FOR PROVIDING A NATURAL COLOUR AND OPTICAL DEPTH TO A DENTAL OBJECT

(71) Applicant: ORALCOL ASSETS HOLDING B.V., Rijswijk (NL)

(72) Inventor: Hong-Vu Dang, Rijswijk (NL)

(73) Assignee: ORALCOL ASSETS HOLDING B.V., Rijswijk (NL)

( * ) Notice: Subject to any disclaimer, the term of this patent is extended or adjusted under 35 U.S.C. 154(b) by 303 days.

(21) Appl. No.: 17/439,327

(22) PCT Filed: Mar. 12, 2020

(86) PCT No.: PCT/NL2020/050165
§ 371 (c)(1),
(2) Date: Sep. 14, 2021

(87) PCT Pub. No.: WO2020/185086
PCT Pub. Date: Sep. 17, 2020

(65) Prior Publication Data
US 2022/0168079 A1    Jun. 2, 2022

(30) Foreign Application Priority Data
Mar. 14, 2019  (NL) ..................... 2022738

(51) Int. Cl.
| | | |
|---|---|---|
| *A61C 13/08* | (2006.01) | |
| *B41M 5/00* | (2006.01) | |
| *B41M 7/00* | (2006.01) | |
| *G01J 3/46* | (2006.01) | |
| *G01J 3/50* | (2006.01) | |

(52) U.S. Cl.
CPC ........... *A61C 13/082* (2013.01); *B41M 5/007* (2013.01); *B41M 5/0047* (2013.01); *B41M 5/0088* (2013.01); *B41M 7/0036* (2013.01); *G01J 3/463* (2013.01); *G01J 3/508* (2013.01)

(58) Field of Classification Search
None
See application file for complete search history.

(56) References Cited

U.S. PATENT DOCUMENTS 8,945,665 B2 *   2/2015   Yarovesky ............... A61C 5/73
433/223

FOREIGN PATENT DOCUMENTS

| WO | 2009/070469 A1 | 6/2009 |
| WO | 2009/154301 A1 | 12/2009 |
| WO | 2015/082081 A1 | 6/2015 |

OTHER PUBLICATIONS

International Search Report and Written Opinion for PCT/NL2020/050165 dated Jun. 18, 2020, 10 pages.

* cited by examiner

*Primary Examiner* — Bradley W Thies
(74) *Attorney, Agent, or Firm* — Casimir Jones SC; Tyler Sisk

(57) ABSTRACT

Method for providing a natural colour and optical depth to a dental object comprising the steps: providing a framework of the dental object, taking an object colour picture of an adjacent dental object or reference dental object, and uploading the object colour picture into a computing device, calibrating and adjusting the uploaded object colour picture into a target object colour picture in a computing device, (pre)determining the thickness profile of the enamel material to be applied on the framework, correcting in a computing device of the digital picture elements of the target object colour picture for the thickness profile of the enamel material to be applied on the position of the digital picture elements and providing a print colour picture of the corrected digital picture elements, printing the print colour picture as a print layer on the framework, applying the enamel material in the predetermined profile-thickness upon the print layer upon the framework.

6 Claims, No Drawings

METHOD FOR PROVIDING A NATURAL COLOUR AND OPTICAL DEPTH TO A DENTAL OBJECT

CROSS-REFERENCE TO RELATED APPLICATIONS

This patent application is a U.S. national stage filing under 35 U.S.C. 371 of International Application No. PCT/NL2020/050165, filed Mar. 12, 2020, which claims the benefit of priority of Netherlands Patent Application No. 2022738, filed Mar. 14, 2019, both of which are incorporated herein by reference in their entirety.

The present invention relates to a method for providing a natural colour and optical depth to a dental object, wherein the dental object has a substantially identical colour and optical properties to nearby/adjacent dental objects or to a reference dental object.

BACKGROUND

More particularly, the method according to the invention is directed towards improvements with respect to the colour and appearance of computer aided designed and computer aided manufactured (CAD/CAM) replacement teeth compared to natural teeth and/or oral tissue in the oral cavity of a person.

Currently the manufacturing of highly aesthetic replacement dental objects require a significant amount of manual labour by highly specialized and skilled dental technicians in dental laboratories. For manufacturing high quality, highly aesthetic replacement dental objects consistently the dental technicians are required to possess a high level of artistic ability and experience. The aesthetic quality of machine fabricated dental objects is currently far behind the quality of those fabricated by skilled dental technicians. Furthermore, dentists and their patients continuously ask for faster delivery at lower costs.

In manufacturing the majority of replacement dental objects, firstly a framework is provided based on the selected material, and on the shape and colour of the tooth to be replaced or on the adjacent teeth. Usually, this framework is manufactured from a ceramic material, a metal alloy or a composite/resin material, and serves as a basis for the subsequent layers of the replacement dental object.

In order to lower the costs of manufacturing replacement dental objects and to reduce the time and effort of the dental technician, in U.S. Pat. No. 8,945,665 a method for printing a decal is disclosed, wherein the decal is based on pictures of (adjacent) remaining natural teeth of the patient. An artist creates multiple sets of images to replicate the natural tooth colour and optical characteristics by means of drawings or photographs. The dentist and/or the patient selects replica image(s) having the desired characteristics from a chart/catalogue. Furthermore, the artists' images are transferred to computer software and are printed to a decal or sticker. The dental lab technician selects the decal(s) matching the replica image(s) selected by the dentist and/or patient and creates the replacement dental object by adhering the selected decal onto the dentin coloured (composite resin) framework. Then a layer of enamel coloured composite resin is provided over the framework with the decal. Optionally a second external decal is placed on the enamel coloured resin and optionally a layer of glaze is provided.

This method has the disadvantage that an artist is needed, which must provide a catalogue with multiple sets of images based on the natural tooth of the patient. Also, the colours printed on the decal are not calculated beforehand, therefore the colour and appearance obtained by this method after applying enamel are not consistent and will only result in acceptable replacement teeth after extensive trial and error. Furthermore, the dental technician and or the dentist must choose an appropriate decal based on the choice of the replica image by the patient. Accordingly, the method in U.S. Pat. No. 8,945,665 still requires highly specialized and skilled dental technicians and also a skilled artist.

PCT/P2009/061541 discloses a method of colouring the dental object by measuring the natural teeth adjacent to the replacement dental object by means of a colorimetric means like a digital camera. De colorimetric means determines a single overall colour of the adjacent tooth, which may be subjected to a gradient. A three-dimensional object printing means prints the determined colour, optionally with the gradient, onto the dental object or prosthesis. Colours may overlap with each other; and the state in which the colour and the prosthesis are superposed on each other is displayed on (computer) screen, and the result of the colouring can be assessed.

These trials are repeated, and based on the determined tooth colour, the printing means for three-dimensional object is driven and (repeatably) printed.

This method determines a single colour for the natural tooth averaging all the natural colour details, which means that most details of the natural tooth are not replicated. Furthermore, again the dental technician must perform multiple trials in order to obtain a good copy of the colouring of the adjacent teeth, and the method does not allow for the colour to emerge from underneath enamel material, as is the case with natural teeth.

WO 2015/082081 discloses a method for applying or printing colour to a framework or a carrier foil of a replacement dental object by using scan-data. The effect of the enamel layer on the coloured framework or carrier foil for the framework is not corrected, therefore the colour and colour appearance of the replacement tooth is not resembling the colour of nearby/adjacent natural teeth.

WO 2009/070469 discloses a method of fabricating a replacement dental article with a combination of digitally-controlled reductive processes such as milling and digitally-controlled additive processes such as digital painting by capturing a highly detailed three-dimensional digital model of a dental article. However, in the additive processes of painting or printing and subsequently applying enamel, the influence of the enamel layer on the colour of the dental article is not taken into account, so that manual correcting and trial and error is necessary to obtain the correct colour.

The term "dental object", as used herein, is based on the definitions given in [0025] of WO 2009/070469. The term "dental object" is intended to refer broadly to subject matter specific to dentistry. This may include intraoral structures such as dentition, and more typically human dentition, such as individual teeth, quadrants, full arches, pairs of arches which may be separate or in occlusion of various types, soft tissue, and the like, as well as bones and any other supporting or surrounding structures. Intraoral structures refer to both natural structures within a mouth as described above and artificial structures such as any of the dental objects described below that might be present in the mouth. Man-made dental objects (also indicated with dental articles) may include restorations, which may be generally understood to include components that restore the structure or function of existing dentition, such as crowns, bridges, veneers, inlays, onlays, amalgams, composites, and various substructures such as copings and the like, as well as temporary restorations for use while a permanent restoration is being fabricated. Dental objects may also include a prosthesis that replaces dentition with removable or permanent structures, such as dentures, partial dentures, implants, retained dentures, and the like. Dental objects may also include appliances used to correct, align, or otherwise temporarily or permanently adjust dentition, such as removable orthodontic appliances, surgical stents, bruxism appliances, snore guards, indirect bracket placement appliances, and the like. Dental objects may also include hardware affixed to dentition for an extended period, such as implant fixtures, implant abutments, orthodontic brackets, and other orthodontic components. Dental objects may also include interim components of dental manufacture such as dental models (full or partial), wax-ups, investment moulds, and the like, as well as trays, bases, dies, and other components employed in the fabrication of restorations, prostheses, and the like. Dental objects may also be categorized as natural dental objects such as the teeth, bone, and other intraoral structures described above or as artificial dental objects (also indicated as man-made dental objects) such as the restorations, prostheses, appliances, hardware, and interim components of dental manufacture as described above. A dental article may be fabricated intraorally, extraorally, or some combination of these.

OBJECT OF THE INVENTION

Object of the present invention is therefore to provide for a method which overcomes the disadvantages of the known methods and systems and which simplifies the process of finding and applying the correct colour for the dental object without requiring extensive trials by a dental technician.

SUMMARY OF THE INVENTION

Accordingly, the method according to the invention comprises:
  providing a patient specific framework of the dental object based on a previous dental object or a nearby/adjacent/chosen natural tooth or a reference dental object,
  taking an object colour picture or 3d colour object scan of one or more nearby/adjacent/chosen natural tooth or reference dental object, and uploading the digital picture elements of the object colour picture or of the 3d colour object scan into a computing device,
  optionally calibrating and/or adjusting the digital picture elements of the uploaded object colour picture or 3d colour object scan with regard to the image size and/or the resolution,
  defining the target object colour picture in a computing device based on the object colour picture or 3d colour object scan,
  selecting an enamel material and (pre)determining the thickness profile of the enamel material to be applied on the framework,
  correcting in a computing device of the digital picture elements of the target object colour picture for the thickness profile of the enamel material to be applied at the position of the digital picture elements by means of a formula expressing the relationship between colour measurements over a known enamel layer thickness, and providing a print colour picture of the corrected digital picture elements of the target object colour picture,
  printing the print colour picture comprising the corrected digital picture elements as a print layer on the framework,
  applying the enamel material in the predetermined profile-thickness upon the print layer upon the framework.

By correcting the target object colour picture for the optical and colour properties of the enamel layer it is possible, without trial and error by an experienced and skilled technician, to calculate a print colour picture suitable for printing with an appropriate printing device upon the framework for the replacement dental object.

Another advantage of this method is that the enamel material is made up of one single monochromatic material, as opposed to several different colours when manually applied by a skilled technician. With this method, the different optical nuances and characteristics are achieved by applying the colour underneath the monochromatic enamel layer, which actually emulates natural teeth in a better way, as natural enamel material is also relatively monochromatic. It is also much easier to apply a monochromatic enamel material than applying multiple materials in different layers, either manually or with a machine, such as a 3d-printer or a machine milled enamel layer. In case of manual application of the enamel material the technician can focus solely on the shape and does not have to worry about the colour, thereby reducing time, costs and experience needed. This same principle can be also used to produce other tissues like gums, prosthetic eyes and limbs. In these cases, the enamel layer acts as a translucent layer providing optical depth as needed.

In case of machine fabricated enamel material, the enamel material can be applied directly over the colour print layer by means of a 3d printer, injection technique, or indirectly by applying/bonding a machine-milled or 3d printed or ceramic pressed enamel layer over the colour printed framework. If necessary the enamel layer can be post-processed/finished after applying the enamel in case of overcontoured enamel, and/or for applying texture and gloss.

The terms "printing the print colour picture . . . as a print layer on the framework" and "applying the enamel material . . . upon the print layer upon the framework" also include the alternative of printing the print colour picture as a print layer on the inside of the enamel layer.

Preferably, a colour space is used for the digital picture elements comprised in: the object colour picture, the 3d colour object scan, the target object colour picture and the print colour picture.

Advantageously, one colour space is used for all the picture elements involved in the method according to the invention. This simplifies the required calculations and/or corrections in a computing device. However, as conversion equations and software are available for processing digital images in order to convert them between different colour spaces, it is also possible to use a different colour space for each colour picture used.

In particular, the CIELAB colour space is chosen for the digital picture elements comprised in: the object colour picture, the 3d colour object scan, the target object colour picture and the print colour picture, wherein the colour of each digital picture element (P) is represented by (L*), (a*), (b*), wherein (L*) is a value indicating the lightness and (a*) is a value indicating the green-red colour component of the colour and (b*) is a value indicating the blue-yellow component of the colour, and wherein (xP) is the thickness of the enamel material at digital picture element (P), wherein the step of correcting the (L*), (a*), (b*) values of digital picture element (P) of the target object colour picture comprises:

determining the formula for calculating (L*), (a*), (b*) enamel corrected values derived by polynomial regression from measured (L*), (a*), (b*) values of the enamel material applied at a range of enamel thickness values (x) upon a range of (L*), (a*), (b*) possible underlying colours, hereinafter referred to as enamel correction formula, calculating the (L*), (a*), (b*) enamel corrected values for each digital picture element (P) of the target object colour picture for each enamel thickness (xP) by means of the enamel correction formula, and providing the enamel corrected print colour picture from the (L*), (a*), (b*) enamel corrected values of the digital picture elements (P) of the target object colour picture.

By determining and using a polynomial regression formula based on measurement of the enamel material to be applied, the enamel corrected print colour picture suitable for printing on the framework is obtained quickly and easily without human assessment, comparing or experience. An alternative method for attaining the enamel corrected print colour picture is by using artificial intelligence/machine learning.

Preferable, (yP) is the thickness of the framework material at digital picture element (P), wherein the step of correcting the (L*), (a*), (b*) values of the digital picture element (P) of the target object colour picture comprises the steps of:

determining a formula for calculating (L*), (a*), (b*) framework corrected values derived by polynomial regression from measured (L*), (a*), (b*) values of the framework material applied at a range of framework thickness values (y) upon a range of (L*), (a*), (b*) die material and/or meso structure colours, hereinafter referred to as framework correction formula, calculating the (L*), (a*), (b*) framework and enamel corrected values for each digital picture element (P) of the enamel corrected print colour picture for each framework thickness (yP) by means of the framework correction formula, and providing the framework and enamel corrected print colour picture from the (L*), (a*), (b*) framework and enamel corrected values of the digital picture elements (P) of the target object colour picture.

By using a framework correction formula based on measurements of the optical properties of the framework material to be used, the enamel corrected print colour picture may also be easily corrected for the (L*), (a*), (b*) values of the framework, which are the result of the colour and optical properties of varying thickness of the framework material influenced by the underlying natural die/preparation/stump/meso structure colour provided.

Preferable, calculating the (L*), (a*), (b*) framework and enamel corrected values for each digital picture element (P) of the enamel corrected print colour picture for each framework thickness (yP) by means of the framework correction formula additionally comprises the steps of:

determining (L*), (a*), (b*) stump/natural die/preparation/meso structure values by means of a photograph, 3d colour scan or visual assessment by a person, calculating the (L*), (a*), (b*) framework and enamel corrected values for each digital picture element (P) of the enamel corrected print colour picture for each framework thickness (yP) by means of the framework correction formula by using the (L*), (a*), (b*) stump/natural die/preparation/meso structure colour values.

When the (L*), (a*), (b*) values for the stump/natural die/preparation/meso structure are known, by using the framework correction formula an additional correction for the (L*), (a*), (b*) enamel corrected values for each digital picture element (P) of the enamel corrected print colour picture is easily calculated. This provides for an even more accurate colour match of the target dental object.

Preferably, the step of correcting in a computing device of the digital picture elements of the target object colour picture for the thickness profile of the enamel material comprises the step: providing on a display medium of a 2d and/or 3d simulation of the target object colour picture and/or the print colour picture and/or the print colour picture covered by an enamel material.

When a 3d face scan is used in designing the dental object, usually the teeth look like solid white teeth. By applying a 2d and/or 3d simulation of the print colour picture covered by a virtual enamel layer into the 2d portrait or 3d face scan, a lifelike simulation of teeth with optical depth and realistic colours on a display medium like a computer screen is possible before the dental object is manufactured. The design of the dental object on the display medium then actually contains the target object colour picture and/or the print colour picture to be used for the subsequent printing process. This is a very valuable simulation for a CAD software system, allowing for a very realistic preview of the end result of the dental object in situ for the patient and dentist.

The features and advantages described in this summary and the following detailed description are not all inclusive. Many additional features and advantages will be apparent to one of ordinary skill in the art in view of the examples, specification and claims hereof.

DETAILED DESCRIPTION OF PREFERRED EMBODIMENTS

First Example of the Method According to the Invention

A patient needing a replacement dental object, like a replacement incisor, will visit a dentist for advice and for the treatment required. The dentist will prepare the tooth to be replaced dependent on the quality of the existing tooth and on the state and condition of the adjacent tooth in the oral cavity of the patient. Then the dentist provides the dental technician with the patient records and (digital) impressions. In this simplified example, firstly a framework is manufactured as a basis for the replacement tooth. This framework of the replacement dental object is provided with a white colour. In the CIELAB colour space this could be L=85, a=0, b=0. Alternatively, the framework can be provided with a colour that in part approximates the target colour, so that additional colour adjustments and characteristics will only be printed on the parts where colour correction is necessary. The framework may also be provided with a white colour or opaque material, blocking the discoloured preparation and/or meso structure and providing enough brightness to function as a "canvas". The framework material and shape of the replacement tooth is derived from a photograph and/or 3d scan and/or other dimensions of the original tooth or from a nearby/adjacent/chosen tooth or from a reference dental object and may be 3d printed or manufactured by means of other well-known methods.

The term "reference dental object", as used herein, is intended to refer broadly to dental objects outside the mouth of the patient. Instead of trying to carefully copy and reproduce the shape and/or colour of one or more teeth of the patient, the patient can also choose an external "reference dental object" as starting point for the replacement tooth.

When the patient desires to have a pronounced, distinct replacement tooth which clearly stands out, the patent can choose the reference dental object from a catalogue or a collection, or the patient can choose a colour or an (colour) image or pattern from an image database for the reference dental object. The shape and the colouring of the reference dental object may separately be chosen or designed.

If the patient desires to have a replacement tooth, which is neither obvious nor clearly visible, the colour and shape of the replacement tooth must match with the adjacent teeth and oral tissue in the oral cavity of the patient. Therefore, photographs are taken from the adjacent teeth as target for the replacement tooth. It is also possible to use the 3d scan of the adjacent teeth or to choose a colour for the target appearance of the replacement tooth. The object colour picture is the final appearance in the oral cavity of the replacement tooth comparable to the adjacent teeth. When this object colour picture is printed on the white framework, the framework will look like a copy of the adjacent teeth. However, after applying enamel material upon the framework with the printed layer of the object colour picture, in order to provide optical depth as seen in natural teeth, the final result of the dental object does not resemble the adjacent teeth, caused by the optical properties of the enamel material.

Digital imaging is the creation of a digitally encoded representation of the visual characteristics of an object. Digital imaging is assumed to imply or include the processing, compression, storage, printing, and display of such images.

In digital imaging or computer graphics, a pixel, or (digital) picture element is a physical point in a raster image, or the smallest addressable element in an all points addressable display medium. A raster image or bitmap image is a dot matrix data structure that represents a generally rectangular grid of pixels, viewable via a monitor, paper, or other display medium. Raster images are stored in image files with varying formats (such as e.g. a PEG file).

The definition of pixel is context-sensitive. For example, there can be "printed pixels" in a page, or pixels carried by electronic signals, or represented by digital values, or pixels on a display medium (device), or pixels in a digital camera (photosensor elements). Other structures for digitally representing an image or picture can be used, like vector graphics. Raster images can be vectorized (raster images converted into vector graphics), vector images can be rasterized (converted into pixels), by software.

Each pixel is a sample of the original image. The intensity of each pixel is variable. In colour imaging systems, like CIELAB, RGB or CMYK colour space, the colour of a pixel is typically represented by three or four component intensities (values) such as red, green, and blue, or cyan, magenta, yellow, and black.

In a camera or scanner sensor context, pixel refers to a single scalar element of a multi-component representation, or may refer to the set of component intensities for a spatial position. The measures dots per inch (dpi) and pixels per inch (ppi) are sometimes used interchangeably, but have distinct meanings, especially for printer devices, where dpi is a measure of the printer's density of dot (e.g. ink droplet) placement.

(Ref: https://en.wikipedia.org/wiki/Digital imaging https://en.wikipedia.org/wiki/Pixel and https://en.wikipedia.org/wiki/Raster graphics)

Hereinafter, the term 'digital picture element' P refers to a pixel, a subset of pixels or vector image data of a digital image.

Hereinafter, the term 'colour space' (also 'colour model') is used for (digital) colour imaging systems, which preferably are chosen from the list of well-know and often used colour spaces like: Natural Color System (NCS), Adobe RGB and sRGB, CIELAB or CIEXYZ colour spaces. (https://en.wikipedia.org/wiki/List_of_color_spaces_and_their_uses)

The term 'calibrating and adjusting image size and resolution' broadly refers to all necessary adjustments/corrections of the 'digital picture elements' in digital images used in the method according to the invention, such as the object colour picture, the 3d colour object scan, the target object colour picture and the print colour picture.

The adjustment of image size and resolution of the object colour picture or of the 3d colour object scan may include: cutting away unnecessary information, for example gums, lips, teeth that do not need to be used and printed. Then the object colour picture or the 3d colour object scan may be made suitable for the next step. Sometimes the object colour picture or the 3d colour object scan has to be mirrored, transformed, due to the difference in size and position of the natural teeth, and the number of digital picture elements may be adjusted to the desired print resolution. Optionally, artefacts such as (un)desired discolorations, cracks, spots may be removed and/or added. Alternatively, it is possible to configure a new tooth image based on the measured colours and adjust the characteristics according to taste. Calibration of a digital image involves calibration of camera profiles, white balance, etcetera, because every camera/lens/flash combination records the colours slightly differently, which must be standardized/calibrated using camera profiles/lookup tables (LUTs), etc. During taking the object colour picture or 3d colour object scan, sometimes polarization filters are used to eliminate reflection of (flash) light on the (natural) teeth or on the reference dental object. However, using polarization filters also results in a colour deviation comparable to what sunglasses do, and this polarization filter colour deviation must be corrected by a conversion through profiles/LUTs and/or adjustment curves.

Therefore, the object colour picture or the 3d colour object scan is uploaded as digital data comprising digital picture elements into a computing device, and optionally colour-calibrated if necessary. In the computing device, if necessary, the image size and the resolution of the picture or the scan is adjusted to the format required by the printer to be used for printing on the framework. This picture or data file is the target object colour picture comprising digital picture elements for the printer.

In the next step, the thickness profile is determined of the enamel material to be applied over de framework comprising the print layer. This enamel layer may be simply having one thickness over the entire framework, but better results are obtained when the enamel is applied over the framework having a variable natural thickness. Usually the thickness varies from about 0.3 mm at the cervical base to about 1 mm near the incisal edge of the incisor. The enamel may also vary in thickness in the orthogonal direction, that is in the horizontal direction in the oral cavity. For each digital picture element P to be printed on the framework by the printer an enamel thickness x is determined and uploaded into the computing device.

In the next step in the computing device, the digital picture elements of the target object colour picture are each corrected by means of thickness xP of the enamel material to be applied on or above digital picture element P.

This correction is performed or calculated by means of a formula expressing a relationship between the physical quantities: component intensities (also indicated with values) within colour space CS of the layer beneath the enamel material; thickness xP of the enamel material; component intensities within colour space CS of the outer enamel material. Within colour space CS, the component intensities of the digital picture elements of the target object colour picture closely match the component intensities of the printed framework covered by the outer enamel material. Because thickness xP is also known for each digital picture element P of the target object colour picture, the component intensities of the digital picture elements of the print colour picture can be calculated. In computing, a formula typically describes a calculation, to be performed on one or more variables. A formula is often implicitly provided in the form of a computer instruction.

Accordingly, the term 'formula' as used herein, is intended to refer broadly to all types of relationships between variables, (measured) physical quantities etcetera, suitable for use in performing calculations and/or corrections. Other well-known methods for defining this relationship may also be used, like e.g. artificial intelligence such as (self learning) artificial neural networks, machine learning, etcetera.

In a preferred embodiment of the method according to the invention the correction is performed by means of an enamel correction formula. In particular, the enamel correction formula is derived from colour measurements of samples having a range of thickness values of the chosen enamel material applied on a range of possible underlying reference colours. With this enamel correction formula there is a direct relation available between the colour of the target object colour picture of the replacement tooth as observed by other persons and the colour of the picture to be printed under the enamel layer of variable thickness.

By using the enamel correction formula, each digital picture element P of the target object colour picture is corrected for the influence of the enamel thickness xP covering the digital picture element. By means of this correction, a set of individually corrected digital picture elements is obtained, which together form a print colour picture, which is printed on the framework by means of the printer. When printing on more complex shapes (such as complete dentures) more than three axes can be used so that the print head can print the object from multiple angles.

After applying or printing the enamel material in the predetermined profile-thickness upon the print layer over the framework, the appearance of the replacement tooth strongly resembles the target object, without having performed time-consuming extensive trails by the dentist and/or dental technician.

Optionally, micro surface structures may be provided on the outside of the enamel layer. These micro surface structures can be printed by using an inkjet system or milled either manually or by machine.

Preferably, the CIELAB colour space is used for the pictures, the calculations and the printing, but alternative systems like RGB or CMYK may also be used.

By using the CIELAB colour space an enamel correction formula is determined for the computing device. Samples are measured with a range of possible underlying reference colours being provided with a range of enamel thickness values, and the L*a*b* values of each measurement are fitted into a polynomial regression routine determining the applicable coefficients for the best fit. By applying the enamel correction formula, for each digital picture element P of the target object colour picture, the corresponding CIELAB enamel corrected values for the digital picture element at the appropriate enamel thickness xP of the enamel corrected print colour picture can be calculated.

Second Example

In the first example, the framework is provided with a white opaque colour, which does not interfere with the colour and optical properties of the print layer and the enamel material. However, often the framework material is somewhat translucent and not completely opaque so that a perfect white surface colour of the framework is not available. For attaching the replacement tooth in the oral cavity, different types of attachments systems are available, each giving rise to specific constructions and (de)colouring of the mounted framework and replacement dental object.

A stump, natural die or preparation is (the remains) of a natural tooth, which is prepared for mounting thereupon the replacement dental object. The colour of this stump may be visible through the new dental object. Therefore, this underlying colour must be taken into account, by compensating for unwanted shading. In the case of an implant (which is in fact an artificial root), a so-called abutment (or other types of meso structures) is often screwed onto the implant. This abutment is functionally identical to the stump/preparation and also serves as basis for attaching the replacement dental object. This abutment therefore, just like a natural tooth stump/preparation, influences the final appearance of the replacement dental object because the colour of the abutment can partially show through the replacement dental object.

When a stump/preparation/natural die/meso structure is prepared by the dentist to attach the framework of the replacement tooth, this stump/preparation/natural die/meso structure often is discoloured, which will be visible through the framework and will interfere with the print colour picture layer, resulting in a less matching replacement dental object.

Accordingly, a formula for calculating L*a*b* framework corrected values is determined by measuring L*a*b* values for a range of L*a*b* die material colours provided with a framework in a range of thickness values y. By means of polynomial regression, from these measurements a framework correction formula is derived, which provides a relation between the L*a*b* values of the framework mounted on the stump/preparation/natural die/meso structure in respect of the colour of the stump/preparation/natural die/meso structure and the thickness y and the properties of the framework material.

With this framework correction formula, the enamel corrected values for each digital picture element P of the enamel corrected print colour picture can be further corrected for the influence of the optical properties and the colour of stump/preparation/natural die/meso structure and the framework. The L*a*b* framework and enamel corrected values of the digital picture elements P together form the framework and enamel print colour picture, suitable for printing on the framework by means of the printer.

In a preferred embodiment of the method according to the invention, the L*a*b* stump/natural die/meso structure values are determined by means of a photograph, 3d colour scan, comparison with a reference object, or visual assessment by a person. So that the L*a*b* framework and enamel corrected values for each digital picture element P of the enamel corrected print colour picture for each framework thickness yP is calculated by means of the framework correction formula by using the L*a*b* stump/natural die/meso structure values.

In this embodiment, only photographs are needed of the stump and of the adjacent teeth in order to be able to efficiently calculate the correct print layer and provided a very good matching replacement dental object.

The invention claimed is:

1. Method for providing a natural colour and optical depth to a dental object, wherein the dental object has a substantially identical colour and optical properties to nearby/adjacent dental objects or to a reference dental object, the method comprising the steps:

providing a patient specific framework of the dental object based on a previous dental object or a nearby/adjacent/chosen natural tooth or a reference dental object, taking an object colour picture or 3d colour object scan of one or more nearby/adjacent/chosen natural tooth or reference dental object, and uploading the digital picture elements of the object colour picture or of the 3d colour object scan into a computing device, optionally calibrating and/or adjusting the digital picture elements of the uploaded object colour picture or 3d colour object scan with regard to the image size and/or the resolution, defining the target object colour picture in a computing device based on the object colour picture or 3d colour object scan, selecting an enamel material and (pre)determining the thickness profile of the enamel material to be applied on the framework, correcting in a computing device of the digital picture elements of the target object colour picture for the thickness profile of the enamel material to be applied at the position of the digital picture elements by means of a formula expressing the relationship between colour measurements over a known enamel layer thickness, and providing a print colour picture of the corrected digital picture elements of the target object colour picture, printing the print colour picture comprising the corrected digital picture elements as a print layer on the framework, applying the enamel material in the predetermined profile-thickness upon the print layer upon the framework.

2. Method for providing a natural colour and optical depth to a dental object according to claim 1, wherein a colour space CS is used for the digital picture elements comprised in: the object colour picture, the 3d colour object scan, the target object colour picture and the print colour picture.

3. Method for providing a natural colour and optical depth to a dental object according to claim 2, wherein for the colour space CS the CIELAB colour space is chosen for the digital picture elements comprised in: the object colour picture, the 3d colour object scan, the target object colour picture and the print colour picture;

wherein the colour of each digital picture element (P) is represented by $(L^*)$, $(a^*)$, $(b^*)$, wherein $(L^*)$ is a value indicating the lightness and $(a^*)$ is a value indicating the green-red colour component of the colour and $(b^*)$ is a value indicating the blue-yellow component of the colour, and wherein (xP) is the thickness of the enamel material at digital picture elements (P), wherein the step of correcting the $(L^*)$, $(a^*)$, $(b^*)$ values of the digital picture elements (P) of the target object colour picture comprises:

determining a formula for calculating $(L^*)$, $(a^*)$, $(b^*)$ enamel corrected values derived by polynomial regression from measured $(L^*)$, $(a^*)$, $(b^*)$ values of the enamel material applied at a range of enamel thickness values (x) upon a range of $(L^*)$, $(a^*)$, $(b^*)$ possible underlying colours, hereinafter referred to as enamel correction formula, calculating the $(L^*)$, $(a^*)$, $(b^*)$ enamel corrected values for each digital picture element (P) of the target object colour picture for each enamel thickness (xP) by means of the enamel correction formula, and providing the enamel corrected print colour picture from the $(L^*)$, $(a^*)$, $(b^*)$ enamel corrected values of the digital picture elements (P) of the target object colour picture.

4. Method for providing a natural colour and optical depth to a dental object according to claim 3, wherein (yP) is the thickness of the framework material at digital picture element (P), wherein the step of correcting the $(L^*)$, $(a^*)$, $(b^*)$ values of the digital picture element (P) of the target object colour picture comprises the steps of:

determining a formula for calculating $(L^*)$, $(a^*)$, $(b^*)$ framework corrected values derived by polynomial regression from measured $(L^*)$, $(a^*)$, $(b^*)$ values of the framework material applied at a range of framework thickness values (y) upon a range of $(L^*)$, $(a^*)$, $(b^*)$ die material and meso structure colours, hereinafter referred to as framework correction formula, calculating the $(L^*)$, $(a^*)$, $(b^*)$ framework and enamel corrected values for each digital picture element (P) of the enamel corrected print colour picture for each framework thickness (yP) by means of the framework correction formula, and providing the framework and enamel corrected print colour picture from the $(L^*)$, $(a^*)$, $(b^*)$ framework and enamel corrected values of the digital picture element (P) of the target object colour picture.

5. Method for providing a natural colour and optical depth to a dental object according to claim 3, wherein calculating the $(L^*)$, $(a^*)$, $(b^*)$ framework and enamel corrected values for each digital picture element (P) of the enamel corrected print colour picture for each framework thickness (yP) by means of the framework correction formula additionally comprises the steps of:

determining $(L^*)$, $(a^*)$, $(b^*)$ stump/natural die/preparation/meso structure values by means of a photograph, 3d colour scan or visual assessment by a person, calculating the $(L^*)$, $(a^*)$, $(b^*)$ framework and enamel corrected values for each digital picture element (P) of the enamel corrected print colour picture for each framework thickness (yP) by means of the framework correction formula by using the $(L^*)$, $(a^*)$, $(b^*)$ stump/natural die/meso structure values.

6. Method for providing a natural colour and optical depth to a dental object according to claim 1, wherein the step of correcting in a computing device of the digital picture elements of the target object colour picture for the thickness profile of the enamel material comprises the step: providing on a display medium of a 2d and/or 3d simulation of the target object colour picture and/or the print colour picture and/or the print colour picture covered by an enamel material.

* * * * *